(12) United States Patent
Landers et al.

(10) Patent No.: US 10,470,437 B1
(45) Date of Patent: *Nov. 12, 2019

(54) WIRELESS LOCATION ASSISTED ZONE GUIDANCE SYSTEM

(71) Applicant: GPSip, Inc., Oshkosh, WI (US)

(72) Inventors: Rodney P. Landers, Woodbury, MN (US); Kevin L. Nieuwsma, Lakeville, MN (US); Chad R. James, Redmond, OR (US); Michael D. Erickson, Minneapolis, MN (US)

(73) Assignee: GPSip, Inc., Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,634

(22) Filed: Jan. 3, 2018

Related U.S. Application Data

(63) Continuation-in-part of application No. 15/791,315, filed on Oct. 23, 2017, now Pat. No. 10,080,346.

(Continued)

(51) Int. Cl.
*G08B 23/00* (2006.01)
*A01K 15/02* (2006.01)
(Continued)

(52) U.S. Cl.
CPC ........ *A01K 15/023* (2013.01); *G06F 16/2237* (2019.01); *G06F 16/2264* (2019.01); *G06F 16/2282* (2019.01); *H04W 4/021* (2013.01)

(58) Field of Classification Search
CPC .... A01K 15/02; A01K 15/021; A01K 15/023; A01K 15/029; A01K 15/04
(Continued)

(56) References Cited

U.S. PATENT DOCUMENTS

| | | |
|---|---|---|
| 4,393,448 A | 7/1983 | Dunn et al. |
| 4,590,569 A | 5/1986 | Rogoff et al. |

(Continued)

FOREIGN PATENT DOCUMENTS

| | | |
|---|---|---|
| WO | WO 94/27268 A1 | 11/1994 |
| WO | WO 2015/021116 A1 | 9/2015 |

OTHER PUBLICATIONS

"Boundary Plus Computer Collar Unit Owner's Manual", Invisible Fence, 10 pages.

(Continued)

*Primary Examiner* — David J Parsley
*Assistant Examiner* — Danielle A Clerkley
(74) *Attorney, Agent, or Firm* — Albert W. Watkins

(57) ABSTRACT

A look-up table is defined by at least one reference point, and rows and columns that are offset from the reference. The table rows and columns correspond to ordinate and abscissa data points representing geographic locations. Each data point offset in the table corresponds to a predefined geographic offset. The look-up table contains machine-stored values at each table location, with each value representing a particular one of several guidance zones. The real-time determination of the guidance zone is made by first determining present location using GPS or other wireless location signals. The corresponding table location is identified by calculating latitudinal and longitudinal offsets from a reference point, and using these offsets as the two indices to access a double-indexed array. The value retrieved from the indexed array identifies the guidance zone. Each guidance zone has an associated set of characteristics used to provide guidance.

15 Claims, 5 Drawing Sheets

Related U.S. Application Data which is a continuation of application No. 15/433,826, filed on Feb. 15, 2017, now Pat. No. 9,795,118, which is a continuation of application No. 14/217,390, filed on Mar. 17, 2014, now abandoned.

(60) Provisional application No. 61/801,509, filed on Mar. 15, 2013.

(51) Int. Cl.
*H04W 4/021* (2018.01)
*G06F 16/22* (2019.01)

(58) Field of Classification Search
USPC .......... 119/719–721; 340/573.1, 573.3, 573.4
See application file for complete search history.

(56) References Cited

U.S. PATENT DOCUMENTS

| | | |
|---|---|---|
| 4,611,209 A | 9/1986 | Lemelson et al. |
| 4,817,000 A | 3/1989 | Eberhardt |
| 4,967,696 A | 11/1990 | Tobias |
| 4,999,782 A | 3/1991 | BeVan |
| 5,046,453 A | 9/1991 | Vinci |
| 5,067,441 A | 11/1991 | Weinstein |
| 5,191,341 A | 3/1993 | Gouard et al. |
| 5,351,653 A | 10/1994 | Marischen et al. |
| 5,353,744 A | 10/1994 | Custer |
| 5,355,511 A | 10/1994 | Hatano et al. |
| 5,381,129 A | 1/1995 | Boardman |
| 5,389,934 A | 2/1995 | Kass |
| 5,408,956 A | 4/1995 | Quigley |
| 5,450,329 A | 9/1995 | Tanner |
| 5,491,486 A | 2/1996 | Welles, II et al. |
| 5,568,119 A | 10/1996 | Schipper et al. |
| 5,587,904 A | 12/1996 | Ben-Yair et al. |
| 5,594,425 A | 1/1997 | Ladner et al. |
| 5,751,612 A | 5/1998 | Donovan et al. |
| 5,791,294 A | 8/1998 | Manning |
| 5,857,433 A | 1/1999 | Files |
| 5,868,100 A | 2/1999 | Marsh |
| 5,870,741 A | 2/1999 | Kawabe et al. |
| 5,911,199 A | 6/1999 | Farkas et al. |
| 5,949,350 A | 9/1999 | Girard et al. |
| 6,043,748 A | 3/2000 | Touchton et al. |
| 6,079,367 A | 6/2000 | Stapelfeld et al. |
| 6,114,957 A | 9/2000 | Westrick et al. |
| 6,172,640 B1 | 1/2001 | Durst et al. |
| 6,232,880 B1 | 5/2001 | Anderson et al. |
| 6,232,916 B1 | 5/2001 | Grillo et al. |
| 6,236,358 B1 | 5/2001 | Durst et al. |
| 6,263,836 B1 | 7/2001 | Hollis |
| 6,271,757 B1 | 8/2001 | Touchton et al. |
| 6,313,791 B1 | 11/2001 | Klanke |
| 6,415,742 B1 | 7/2002 | Lee et al. |
| 6,421,001 B1 | 7/2002 | Durst et al. |
| 6,441,778 B1 | 8/2002 | Durst et al. |
| 6,480,147 B2 | 11/2002 | Durst et al. |
| 6,487,992 B1 | 12/2002 | Hollis |
| 6,518,919 B1 | 2/2003 | Durst et al. |
| 6,561,137 B2 | 5/2003 | Oakman |
| 6,581,546 B1 | 6/2003 | Dalland et al. |
| 6,700,492 B2 | 3/2004 | Touchton et al. |
| 6,748,902 B1 | 6/2004 | Boesch et al. |
| 6,903,682 B1 | 6/2005 | Maddox |
| 6,923,146 B2 | 8/2005 | Kobitz et al. |
| 6,943,701 B2 | 9/2005 | Zeineh |
| 7,034,695 B2 | 4/2006 | Troxler |
| 7,259,718 B2 | 8/2007 | Patterson et al. |
| 7,328,671 B2 | 2/2008 | Kates |
| 7,677,204 B1 | 3/2010 | James |
| 7,764,228 B2 | 7/2010 | Durst et al. |
| 7,786,876 B2 | 8/2010 | Troxler |
| 7,856,947 B2 | 12/2010 | Giunta |
| 8,065,074 B1 | 11/2011 | Liccardo |
| 8,115,642 B2 | 2/2012 | Thompson et al. |
| 8,115,942 B2 | 2/2012 | Thompson et al. |
| 8,155,871 B2 | 4/2012 | Lohi et al. |
| 8,624,723 B2 | 1/2014 | Troxler |
| 8,757,098 B2 | 6/2014 | So et al. |
| 8,797,141 B2 | 8/2014 | Best et al. |
| 8,839,744 B1 | 9/2014 | Bianchi et al. |
| 8,851,019 B2 * | 10/2014 | Jesurum ............... A01K 15/023 119/721 |
| 8,955,462 B1 | 2/2015 | Golden |
| 8,957,812 B1 | 2/2015 | Hill et al. |
| 9,226,479 B2 | 1/2016 | Bianchi et al. |
| 9,795,118 B2 * | 10/2017 | Landers ............... A01K 15/023 |
| 9,961,884 B1 | 5/2018 | Landers et al. |
| 10,064,390 B1 | 9/2018 | Landers et al. |
| 10,080,346 B2 | 9/2018 | Landers et al. |
| 10,165,755 B1 | 1/2019 | Landers et al. |
| 10,165,756 B1 | 1/2019 | Landers et al. |
| 10,172,325 B1 | 1/2019 | Landers et al. |
| 2001/0026240 A1 | 10/2001 | Neher |
| 2002/0196151 A1 * | 12/2002 | Troxler ................ G01C 21/005 340/573.4 |
| 2003/0224772 A1 | 12/2003 | Patzer et al. |
| 2004/0108939 A1 | 6/2004 | Giunta |
| 2004/0196182 A1 | 10/2004 | Unnold |
| 2005/0034683 A1 | 2/2005 | Giunta |
| 2005/0066912 A1 | 3/2005 | Korbitz et al. |
| 2006/0061469 A1 | 3/2006 | Jaeger et al. |
| 2006/0197672 A1 | 9/2006 | Talamas, Jr. et al. |
| 2007/0204804 A1 | 9/2007 | Swanson et al. |
| 2008/0036610 A1 | 2/2008 | Hokuf et al. |
| 2008/0162034 A1 | 7/2008 | Breen |
| 2008/0246656 A1 | 10/2008 | Ghazarian |
| 2008/0252527 A1 | 10/2008 | Garcia |
| 2009/0102668 A1 | 4/2009 | Thompson et al. |
| 2009/0267832 A1 | 10/2009 | Hymel |
| 2009/0289844 A1 | 11/2009 | Palsgrove et al. |
| 2009/0292426 A1 | 11/2009 | Nelson et al. |
| 2009/0325594 A1 | 12/2009 | Lan et al. |
| 2010/0139576 A1 | 6/2010 | Kim et al. |
| 2011/0163873 A1 | 7/2011 | McIntosh |
| 2011/0172916 A1 | 7/2011 | Pakzad et al. |
| 2011/0187537 A1 | 8/2011 | Touchton et al. |
| 2011/0193706 A1 | 8/2011 | Dickerson |
| 2012/0000431 A1 | 1/2012 | Khoshkish |
| 2013/0008391 A1 | 1/2013 | Berntsen |
| 2013/0127658 A1 | 5/2013 | McFarland et al. |
| 2013/0141237 A1 | 6/2013 | Goetzl et al. |
| 2013/0157628 A1 | 6/2013 | Kim et al. |
| 2013/0265165 A1 | 10/2013 | So |
| 2013/0307688 A1 | 11/2013 | Hoffman et al. |
| 2013/0324166 A1 | 12/2013 | Mian et al. |
| 2014/0230755 A1 | 8/2014 | Trenkle et al. |
| 2014/0251233 A1 | 9/2014 | Bianchi et al. |
| 2015/0016730 A1 | 1/2015 | Miller et al. |
| 2015/0020750 A1 | 1/2015 | Jesurum |
| 2015/0040839 A1 | 2/2015 | Goetzl et al. |
| 2015/0107531 A1 | 4/2015 | Golden |
| 2015/0216142 A1 | 8/2015 | Landers et al. |
| 2016/0021849 A1 | 1/2016 | Loosveld |
| 2018/0055011 A1 | 3/2018 | Landers et al. |

OTHER PUBLICATIONS

"Global Pet Finder GPS Pet Tracker", http://www.amazon.com/Global-Pet-Finder-GPS-Tracker/, Nov. 19, 2013, 5 pages.

"Tagg—The Pet Tracker Master Kit, White by Snaptracs, Inc.", http://www.amazon.com/TAGG-The-Pet-Tracker-Guard/, Nov. 19, 2013, 5 pages.

"Boundary Plus", http://www.invisiblefence.com/find-the-right-solution/, Jan. 29, 2013, 3 pages.

"Lookup_table", http://www.Wikipedia.org/wiki/Lookup_table, Feb. 15, 2013, 10 pages.

"SkyFence: Our_Product", http://www:gpspetfence.homestead.com/resources.html, Jan. 29, 2013, 3 pages.

"SkyFence: Purchase", http://www.gpspetfence.homestead.com/Purchase.html, Jan. 29, 2013, 2 pages.

(56) References Cited

OTHER PUBLICATIONS

"Tagg: About Us", http://www.pettracker.com/about-tagg, Jan. 29, 2013, 1 page.
"Kalman Filter", Wikipedia: https://en.wikipedia.org/wiki/Kalman_filter, Jan. 18, 2016, 37 pages.
Skinner, B. F., "Superstition in the Pigeon", Journal of Experimental Psychology, vol. 38, pp. 168-172, 1948.

* cited by examiner

WIRELESS LOCATION ASSISTED ZONE GUIDANCE SYSTEM

CROSS REFERENCE TO RELATED APPLICATIONS

This application is a Continuation-In-Part of U.S. Ser. No. 15/791,315 filed Oct. 23, 2017, which is a Continuation of U.S. Ser. No. 15/433,826 filed Feb. 15, 2017 and granted on Oct. 24, 2017 as U.S. Pat. No. 9,795,118, which in turn is a Continuation of U.S. Ser. No. 14/217,390 filed Mar. 17, 2014 and now abandoned, which in turn claims the benefit under 35 U.S.C. 119(e) of U.S. provisional 61/801,509, filed Mar. 15, 2013, the contents and teachings of each which are incorporated herein by reference in entirety.

BACKGROUND OF THE INVENTION

1. Field of the Invention

This invention pertains generally to electrical communications, and more particularly to condition responsive indicating systems with radio link and including a device for tracking location. The condition responsive indicating systems of the present invention monitor the specific condition of humans, animals, or other devices and apparatus. In one preferred manifestation, a fully self-contained collar designed in accord with the teachings of the present invention monitors the location of a pet such as a dog, and provides well-defined and primarily positive stimulus to train the pet to stay within a predetermined area.

2. Description of the Related Art

Dogs are well-known as "man's best friend" owing to the many beneficial services that they provide. However, and likely since mankind first befriended dogs, there has existed a need to control the territory that a dog has access to. There are many reasons that motivate this need, many which may be relatively unique to a particular dog or owner and others that are far more universal.

Irrespective of the reason, there have been limited ways to exert this control over a dog. One method is a fixed containment structure such as a fence or building. As may be apparent, such structures are typically expensive and time consuming to install, and necessarily static in location. In other words, they are only useful at the location where they are constructed, and so are of no value when a pet and owner travel. Furthermore, these static structures often interfere in other ways with other activities of the dog owner, such as with lawn care or interfering with the owner's movement about a property. In addition, the dog may find ways to bypass the structure, such as by digging under a fence or slipping through a not-quite completely secured gate.

A second approach to controlling accessible territory is through a combination collar and leash or similar restraint. The leash is anchored to a fixed point, or in the best of situations, to a line or cable along which the dog can travel. Unfortunately, most dogs are notoriously bad at untangling or unwrapping a leash from a fixed object. Consequently, dogs tend to tangle the leash about trees, posts and other objects, and can become completely unable to move. If the owner is not aware that the dog has become tangled, this can lead to dangerous situations in cases such as extreme weather or when the dog has been left unattended for an extended period.

Additionally, some dogs are very good at escaping the leash, such as by backing away from the leash and using the leash force to slip off the collar, or by chewing through the leash. Once again, if the owner is unaware, the dog may travel from the desired area into other unsuitable areas such as roadways and the like. This may put both dog and humans in jeopardy, such as when a vehicle swerves to avoid the dog or when a dog has a temperament not suited to the general human population.

The leash also necessarily defines the region in which the dog may travel. For exemplary purposes, with a ground stake and a leash the dog is constrained to a circle. In this example, the owner will typically define the circle to the smallest radius that the dog may desirably travel within. As can be understood, for all but circularly limited areas, this leads to a great deal of space that the dog cannot access, but which would otherwise be suitable for the dog.

In consideration of the limitations of static structures and leashes, various artisans have proposed vary beneficial further techniques that provide more flexibility and capability, such as buried or above ground transmitter antennas and radio collars that either detect the crossing of a buried line or detect the reception or absence of reception of a signal broadcast by the transmitter antenna. These systems remove the physical link between dog and a static structure, meaning the dog will not get tangled in obstacles when moving about. Further, in the case of a buried line, the line may follow any geometry of land, and so is not limited to a circular pattern limited by a particular radius.

Unfortunately, burying a line can be difficult or impossible if there are other objects, such as irrigation systems, buried utility lines, landscaping, hard surfaces, trees, or other fixed objects. Additionally, current soil conditions such as frozen soil or snow covered ground in the winter may also limit the ability to bury the line. Radio systems are also well known to be significantly affected by static and other forms of Electro-Magnetic Interference or Radio-Frequency Interference (EMI-RFI). Consequently, a dog may be shocked or otherwise punished without basis or appropriate reason. As is known in the field of psychology, this random punishment can literally destroy the training of a dog, and may lead to erratic or wanton misbehavior. This problem is also very location dependent, meaning that there are places where there is so much EMI-RFI that a radio system is completely unusable. As a result of the inability to completely eliminate or substantially eradicate the effects of EMI-RFI, the use of these radio systems is far from universal. Instead, many dog owners continue to rely upon static structures or leashes to control the territory accessible by their dog.

With the advent and substantial advancement of Global Positioning Systems (GPS), presently primarily used for navigation, artisans have recognized the opportunity to incorporate GPS technology into pet containment. Several systems have been proposed in the literature for decades, but these systems have not as yet become commercially viable.

One significant limitation of prior art GPS systems is the accuracy of the system. Accuracy can be dependent upon variables such as atmospheric variations, signal reflections and signal loss due to obstacles, and variability intentionally introduced into the system. Similar variability is found in various radio and cellular locating systems.

A GPS or similar navigation system that is accurate to plus or minus ten meters is very adequate for navigational purposes, for example to guide a person to a commercial building for a meeting or for other commerce. However, for pet containment this level of accuracy is completely unacceptable. For exemplary purposes, many residential yards are forty feet wide, or approximately 10 meters. A system that is only accurate to plus or minus ten meters might try to locate the dog in either neighbor's yard, depending upon the system on any given day.

Another limitation is the amount of calculation required to determine whether the pet is within a selected area of containment. Prior art GPS systems use nodes to define the perimeter, and then mathematically calculate where the pet is relative to the nodes. Unfortunately, this requires a substantial amount of computation, which increases greatly as the number of nodes are increased. As a result, these systems commonly rely upon a primary processing system that is remote from the dog, to which the dog's collar is coupled via radio waves or the like. This permits the primary processing system to perform calculations and then relay results or control signals back to the collar. Undesirably, this also adds complexity, drains precious battery power limiting the usable collar time, and again makes the containment system dependent upon conventional radio communications systems. In addition, the need for both the collar and a secondary base station makes the system far less portable. This means, for example, that taking the dog from home to a park is impractical.

A further limitation of the prior art is battery life. A collar that must be removed and recharged every few hours is unacceptable for most purposes. Unfortunately, the intensive computations required by prior art systems either requires a fast and consequently higher power processor unit, or a communications link such as a radio link to a base station. While the collar unit may transmit data back to the base unit to avoid the need for complex computational ability, even the transmission of position information and reception of collar actions requires a reasonably powered radio. It will be apparent that walkie-talkies, cell phones and other hand-held radio devices all have very large batteries to provide adequate transmission and reception life, and yet these devices often only support several hours of communications. As can be appreciated, size and weight are severely restricted for a device fully self-contained on a dog's collar, and the inclusion of a large battery is undesirable.

The following patents and published patent applications are believed to be exemplary of the most relevant prior art, and the teachings and contents of each are incorporated herein by reference: U.S. Pat. No. 4,393,448 by Dunn et al, entitled "Navigational plotting system"; U.S. Pat. No. 4,590,569 by Rogoff et al, entitled "Navigation system including an integrated electronic chart display"; U.S. Pat. No. 4,611,209 by Lemelson et al, entitled "Navigation warning system and method"; U.S. Pat. No. 4,817,000 by Eberhardt, entitled "Automatic guided vehicle system"; U.S. Pat. No. 4,999,782 by BeVan, entitled "Fixed curved path waypoint transition for aircraft"; U.S. Pat. No. 5,067,441 by Weinstein, entitled "Electronic assembly for restricting animals to defined areas"; U.S. Pat. No. 5,191,341 by Gouard et al, entitled "System for sea navigation or traffic control/assistance"; U.S. Pat. No. 5,351,653 by Marischen et al, entitled "Animal training method using positive and negative audio stimuli"; U.S. Pat. No. 5,353,744 by Custer, entitled "Animal control apparatus"; U.S. Pat. No. 5,355,511 by Hatano et al, entitled "Position monitoring for communicable and uncommunicable mobile stations"; U.S. Pat. No. 5,381,129 by Boardman, entitled "Wireless pet containment system"; U.S. Pat. No. 5,389,934 by Kass, entitled "Portable locating system"; U.S. Pat. No. 5,408,956 by Quigley, entitled "Method and apparatus for controlling animals with electronic fencing"; U.S. Pat. No. 5,450,329 by Tanner, entitled "Vehicle location method and system"; U.S. Pat. No. 5,568,119 by Schipper et al, entitled "Arrestee monitoring with variable site boundaries"; U.S. Pat. No. 5,587,904 by Ben-Yair et al, entitled "Air combat monitoring system and methods and apparatus useful therefor"; U.S. Pat. No. 5,594,425 by Ladner et al, entitled "Locator device"; U.S. Pat. No. 5,751,612 by Donovan et al, entitled "System and method for accurate and efficient geodetic database retrieval"; U.S. Pat. No. 5,791,294 by Manning, entitled "Position and physiological data monitoring and control system for animal herding"; U.S. Pat. No. 5,857,433 by Files, entitled "Animal training and tracking device having global positioning satellite unit"; U.S. Pat. No. 5,868,100 by Marsh, entitled "Fenceless animal control system using GPS location information"; U.S. Pat. No. 5,911,199 by Farkas et al, entitled "Pressure sensitive animal training device"; U.S. Pat. No. 5,949,350 by Girard et al, entitled "Location method and apparatus"; U.S. Pat. No. 6,043,748 by Touchton et al, entitled "Satellite relay collar and programmable electronic boundary system for the containment of animals"; U.S. Pat. No. 6,114,957 by Westrick et al, entitled "Pet locator system"; U.S. Pat. No. 6,172,640 by Durst et al, entitled "Pet locator"; U.S. Pat. No. 6,232,880 by Anderson et al, entitled "Animal control system using global positioning and instrumental animal conditioning"; U.S. Pat. No. 6,232,916 by Grillo et al, entitled "GPS restraint system and method for confining a subject within a defined area"; U.S. Pat. No. 6,236,358 by Durst et al, entitled "Mobile object locator"; U.S. Pat. No. 6,263,836 by Hollis, entitled "Dog behavior monitoring and training apparatus"; U.S. Pat. No. 6,271,757 by Touchton et al, entitled "Satellite animal containment system with programmable Boundaries"; U.S. Pat. No. 6,313,791 by Klanke, entitled "Automotive GPS control system"; U.S. Pat. No. 6,421,001 by Durst et al, entitled "Object locator"; U.S. Pat. No. 6,441,778 by Durst et al, entitled "Pet locator"; U.S. Pat. No. 6,480,147 by Durst et al, entitled "Portable position determining device"; U.S. Pat. No. 6,487,992 by Hollis, entitled "Dog behavior monitoring and training apparatus"; U.S. Pat. No. 6,518,919 by Durst et al, entitled "Mobile object locator"; U.S. Pat. No. 6,561,137 by Oakman, entitled "Portable electronic multi-sensory animal containment and tracking device"; U.S. Pat. No. 6,581,546 by Dalland et al, entitled "Animal containment system having a dynamically changing perimeter"; U.S. Pat. No. 6,700,492 by Touchton et al, entitled "Satellite animal containment system with programmable boundaries"; U.S. Pat. No. 6,748,902 by Boesch et al, entitled "System and method for training of animals"; U.S. Pat. No. 6,903,682 by Maddox, entitled "DGPS animal containment system"; U.S. Pat. No. 6,923,146 by Kobitz et al, entitled "Method and apparatus for training and for constraining a subject to a specific area"; U.S. Pat. No. 7,034,695 by Troxler, entitled "Large area position/proximity correction device with alarms using (D)GPS technology"; U.S. Pat. No. 7,259,718 by Patterson et al, entitled "Apparatus and method for keeping pets in a defined boundary having exclusion areas"; U.S. Pat. No. 7,328,671 by Kates, entitled "System and method for computer-controlled animal toy"; U.S. Pat. No. 7,677,204 by James, entitled "Dog training device"; U.S. Pat. No. 8,155,871 by Lohi et al, entitled "Method, device, device arrangement and computer program for tracking a moving object"; 2007/0204804 by Swanson et al, entitled "GPS pet containment system and method"; and 2008/0252527 by Garcia, entitled "Method and apparatus for acquiring local position and overlaying information"; and EP 0699330 and WO 94/27268 by Taylor, entitled "GPS Explorer".

In addition to the foregoing, Webster's New Universal Unabridged Dictionary, Second Edition copyright 1983, is incorporated herein by reference in entirety for the definitions of words and terms used herein.

As taught particularly in U.S. Pat. No. 7,034,695 by Troxler and others incorporated by reference herein above, a system useful for containing a dog to a specific area or region also has application for various machines and apparatus as well, in many instances having similar concerns and challenges. For exemplary and non-limiting purposes, the movement of an airplane or related ground equipment about the tarmac will be limited and restricted to particular distinct areas. Like the pet containment system, tearing up the tarmac to create these distinct areas is costly, inflexible, may interfere with existing utilities such as wiring for landing lights, and is detrimental to the integrity of the pavement.

SUMMARY OF THE INVENTION

In a first manifestation, the invention is a wireless location assisted zone guidance system adapted to contain or modify the behavior of a device or vehicle. The system includes an apparatus mount, a wireless location determination apparatus, at least one signaling apparatus carried by the apparatus mount, a processor coupled to the wireless location determination apparatus and operative to receive latitude and longitude information therefrom, memory accessible by the processor, a human interface, and a plurality of guidance zones defined using the latitude and longitude information. Each one of the plurality of guidance zones has an associated unique set of characteristics used by the processor to provide device or vehicle signaling through the at least one signaling apparatus. The improvement comprises a data table stored in the memory as a two-dimensional array having an ordinate and abscissa, a first one of the ordinate and abscissa corresponding to longitude and a second one of the ordinate and abscissa corresponding to latitude, with each value stored in the data table identifying a one of the plurality of guidance zones.

In a second manifestation, the invention is a method of storing behavioral guidance zone indicia in a double-indexed array having a pair of indices in electronically accessible memory and electronically retrieving behavioral modification actions associated with a current geographic location. In accord with the method, a first one of the double-indexed array indices is electronically associated to a latitudinal offset from a geographic reference point. A second one of the indices is electronically associated to a longitudinal offset from the geographic reference point. A value is stored at each individual array location representing a single behavioral guidance zone selected from a plurality of distinct behavioral guidance zones. A unique set of behavioral processes associated with each one of the plurality of distinct behavioral guidance zones is stored in electronically accessible memory. The current geographic location is represented by latitude and longitude points. A latitudinal offset and a longitudinal offset between the current geographic location and the geographic reference point are electronically determined. The stored value representing the single behavioral guidance zone is electronically retrieved from an individual array location defined by the latitudinal offset and the longitudinal offset. The unique set of behavioral processes associated with the stored value is electronically retrieved.

In a third manifestation, the invention is a wireless location assisted zone guidance system adapted to assist in the management of a device or vehicle. The system comprises a wireless location determination apparatus; and at least one signaling apparatus. A processor is coupled to the wireless location determination apparatus and operative to receive latitude and longitude information therefrom and coupled to the at least one signaling apparatus and adapted to operatively control a generation of stimulation. Memory is coupled with and accessible by the processor. A human interface is adapted to operatively enable selective control over the processor. A data table is stored in the memory as a two-dimensional array having a first index adapted to operatively represent an ordinate and having a second index adapted to operatively represent an abscissa. A plurality of geographically defined guidance zones are operatively stored in the data table, a first one of the ordinate and abscissa corresponding to longitude and a second one of the ordinate and abscissa corresponding to latitude, respectively, with each value stored in the data table identifying a one of the plurality of geographically defined guidance zones. The processor is adapted to operatively receive latitude and longitude information from the wireless location determination apparatus, retrieve a value stored in a location in the data table using the longitude information as the first array index and latitude information as the second array index, and use the retrieved value to determine a one of the plurality of guidance zones that the latitude and longitude information from the wireless location determination apparatus is associated with, and provide behavioral guidance stimulation through the at least one signaling apparatus responsive thereto.

OBJECTS OF THE INVENTION

Exemplary embodiments of the present invention solve inadequacies of the prior art by providing a look-up table. In a most preferred embodiment of the invention, the table is defined by rows and columns that are mapped to ordinate and abscissa data points representing predefined geographic locations. Each data point offset in the table corresponds to a predefined geographic offset. Each data point in the table stores a value indicative of a particular one of several guidance zones. Each guidance zone has an associated set of characteristics used to provide behavioral guidance to a human, an animal, or an apparatus. The determination of the guidance zone is made by determination of the present location using GPS or equivalent signals. Identification of the corresponding table location is made by calculating the latitudinal and longitudinal offsets from a reference point, and using these offsets as the two indices for a double-indexed array. The value retrieved from the double-indexed array identifies the guidance zone. Based upon either or both of location history and the desirability value returned from the table, a variety of actions may be triggered, such as providing appropriate positive or negative stimulus or other guidance stimulus or control.

To further improve the accuracy of determination of present location, a position freshly determined through satellite or radio fixing is compared to one or more recently determined and stored historical positions. Depending upon parameters selected at design time, if an impossible jump in position has occurred, or alternatively if a highly unlikely jump in position has occurred, the freshly determined position may be discarded, and a new position determined again. Consequently, momentary erratic reception which is known to occur in position determination systems will be discarded and will not disrupt the accuracy. This can be vital to the quality of animal behavior training or apparatus management.

The present invention and the preferred and alternative embodiments have been developed with a number of objectives in mind. While not all of these objectives are found in or required of every embodiment, these objectives nevertheless provide a sense of the general intent and the many possible benefits that are available from ones of the various embodiments of the present invention.

A first object of the invention is to provide a safe and humane apparatus for modifying the behavior of a pet. From the descriptions provided herein and the teachings incorporated by reference herein above, it will be apparent that the present invention may also be applied in certain instances to humans, livestock, other animals, or various apparatuses. A second object of the invention is to provide a fully self-contained apparatus that will determine location and provide stimulus based upon that location for extended periods of operation. As a corollary, the fully self-contained apparatus is preferably operational with universally available location systems, including but not limited to satellite GPS, cellular telephone triangulation systems, and radio triangulation system such as Loran, but may alternatively be provided with a custom location system if so desired. By using universally available location systems, there is no limit on the locations where the apparatus may be used. Another object of the present invention is to enable simple and efficient set-up and operation by a person. A further object of the invention is to efficiently and expeditiously train a pet, to significantly reduce training time and increase the effectiveness of the training. As a corollary, embodiments of the present invention will preferably provide the effective animal training while preserving the spirit and positive attitude of the animal. Yet another object of the present invention is to enable a person to set an acceptable area or "safe zone" using only the self-contained apparatus, and to adjust or redefine the area again by simple manipulation of the self-contained apparatus. An additional object of the invention is to enable the self-contained apparatus to automatically generate a number of zones that facilitate positive training and behavior modification, and thereby guide a pet, other living being, or apparatus appropriately.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 5 illustrates the upper left tile or quadrant taken from the map of numerical values of FIG. 4.

DESCRIPTION OF THE PREFERRED EMBODIMENT

Figure 1:
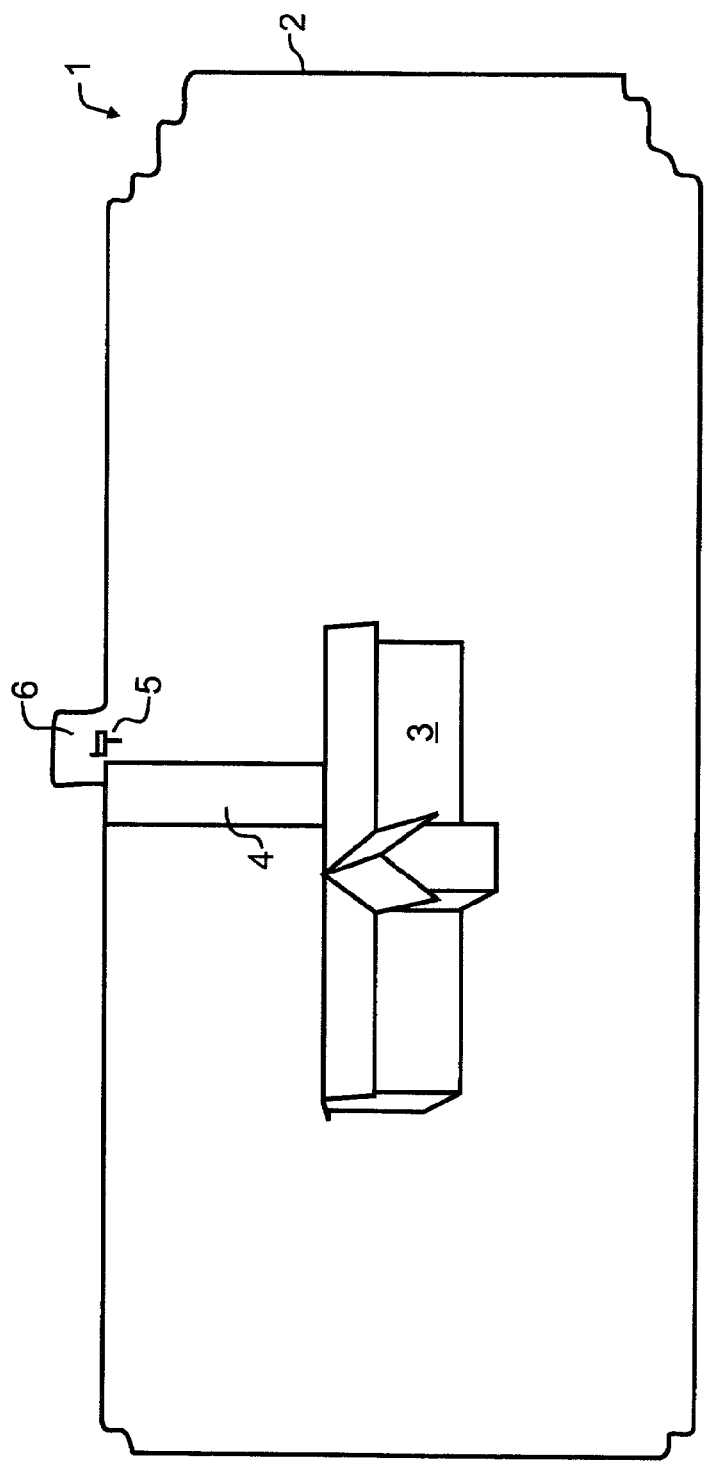
FIG. 1 illustrates a prior art property such as might be mapped in accord with the teachings of the present invention.

In a preferred embodiment designed in accord with the teachings of the present invention, a pet owner might want to train a pet to stay within an example property such as that illustrated in prior art FIG. 1. An outer limit of the property 2 may encompass one or more buildings 3, a driveway 4, and a mailbox 5. If, for exemplary purposes, the pet is or will be trained to walk with the owner to the mailbox, or to retrieve the newspaper from adjacent to the mailbox, then the owner may wish to provide a small peninsula 6 which could extend beyond the bounds of the particular property location.

A self-contained collar apparatus, which might for exemplary purposes and not solely limiting thereto resemble that illustrated by Swanson et al in 2007/0204804 and incorporated by reference herein above, will contain the necessary electronic components such as illustrated in the Swanson et al FIG. 5, including components to receive and decipher location determining signals and also explicitly containing both volatile and non-volatile memory. In the preferred embodiment, the location determining signals are converted to latitude and longitude references, though any suitable coordinate reference representative of a geographic area may be used. Switches and a display will also preferably be provided, again such as illustrated in the Swanson et al published patent application, to allow a person to interact with the collar apparatus. Other requisite components, both as described in Swanson et al and as will be understood from the following description, will also be provided therein.

To establish a new area, a person will interact with the self-contained collar apparatus switches or other suitable input apparatus to identify that a new area is to be recorded. Next, the person will transport the self-contained collar apparatus around the perimeter of the land area, such as by following outer limit 2. During this traverse of the outer limit 2, the self-contained collar apparatus will record discrete location points which have been traversed, and add those to a table stored in a memory within the collar. Once the outer limit 2 has been traversed, the person will again interact with the self-contained collar apparatus to identify that the outer limit has been traversed, or, if so enabled, the collar will automatically detect that an area has been completely circumscribed.

Figure 2:
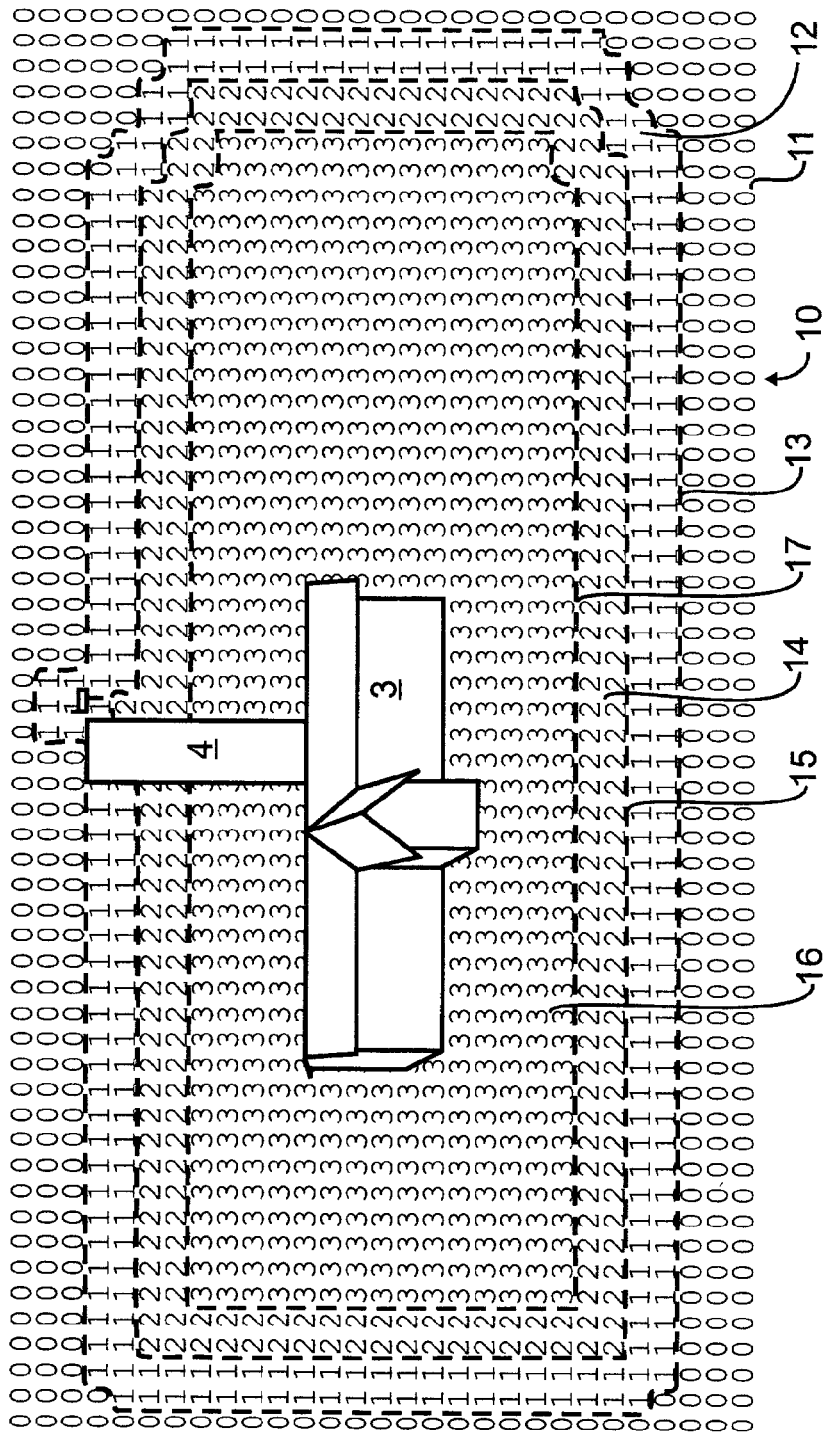
FIG. 2 illustrates a map of numerical values visually overlaid onto and electronically associated with the property of FIG. 1, in accord with the teachings of the present invention.

Next, the micro-controller or other suitable processor will preferably automatically convert this outer limit 2 into a table 10 of values such a illustrated for exemplary purposes in FIG. 2. While the numerals 0-3 are used therein for the purposes of the present illustration, any suitable designations, whether numeric or not, may be used. As but one example, the numerals 0-3 represent four choices, and so may easily be represented by two bits of data. In such case, the possible combinations are binary 00, 01, 10, and 11. While FIGS. 1 and 2 illustrate an exemplary outline of an area that the pet owner might wish to contain a dog within, which is a subset of the total property, the area can be of any geometry, and in the example is somewhat irregular.

In the preferred embodiment, a number of different zones are defined based upon the traversal of outer limit 2 during initial setup. The area beyond outer limit 2 is defined by an "out-of-bounds" zone 11 represented by a numerical value of zero at each discrete location. Immediately inside of the zero-value locations is a zone of locations assigned a numerical value of one. This will be referred to herein as the "warning zone" 12. Between "out-of-bounds" zone 11 and "warning zone" 12 in FIG. 2, a dashed line 13 has been drawn for illustrative purposes. This line does not actually exist in the stored data table, but instead helps to better illustrate the various zones that are defined by the various location values.

A plurality of discrete locations relatively inward from the warning zone 12 are assigned a numerical value of two, and represent an "alert zone" 14. Again, for the purpose of illustration only, a dashed line 15 is shown separating alert zone 14 from warning zone 12. Again, and like line 13, this line 15 does not actually exist in the stored data table, and is provided solely for illustrative purposes.

Finally, an innermost "safe zone" 16 preferably intentionally encompasses the largest area of all zones and is populated with discrete location values assigned to equal the numerical value of three. Dashed line 17, like lines 13 and 15, indicates the separate zones, but does not exist in the stored data table.

As is evident when comparing FIGS. 1 and 2, line 13 corresponds approximately to outer limit 2. Due to the discrete nature of the resolution of the particular position determining system, such as a GPS system, the points defined during the traversal of outer limit 2 may or may not exactly correspond to the land location. In addition, since the outer limit 2 may not be linear, and may instead include a number of irregularities such as peninsula 21 and slightly cropped corners 23 and 26, the data points more interior but generally adjacent to these irregularities will have variability in their associated geometries relative to that of the outer limit 2. So, and again for exemplary purposes, peninsula 21 is too narrow to provide for the as-illustrated exemplary two data point width provided for each zone. Nevertheless, there is a single data point of numerical value 2 protruding at reference numeral 22 illustrated in FIG. 3. Consequently, as outer limit 2 was traversed at set-up, a dog can reach the base of mail box 5, which is located at this single data point of numerical value 2 at reference numeral 22, without receiving a warning stimulus. Nevertheless, the dog will still receive an alert stimulus such as a vibration. Similarly, the intricacies of notched corner 26 are lost as the corner becomes a simple square corner at reference numeral 27 of FIG. 3. Likewise, the elaborate stepping of cropped corner 23 fades some to simpler corner 24, and becomes a very simple single curve at more interior corner 25.

Also strictly for the purpose of illustration, and not limiting the invention solely thereto, two GPS location points are used as the width of each of the alert and warning zones. Consequently, in the embodiment as illustrated, each of these alert and warning zones are calculated to be approximately two GPS points in width. It will be understood herein that the width of the zones may be predetermined to be more or less than the exemplary and illustrated two data points. Furthermore, the number of zones may be varied from the three zones that are illustrated.

While most of the zone areas are, in fact, two data points wide, the width of the zones at sharp transition points, such as corners, may be greater or less than two data points in width. The particular decisions for how to shape interior zones will be determined by algorithms chosen or written by a designer at design time. Furthermore, there may be times where the assisted guidance zone takes on a very irregular shape, forming a narrow peninsula between two larger safe zones. When there is not sufficient room for the predetermined number of zone location pints, such as within peninsula 21 of FIGS. 1 and 2, in the preferred embodiment the data point calculations begin with the warning zone value first.

As may be apparent, a person may choose where to traverse in order to control the formation of various zones. As another example, a person trying to create a larger buffer adjacent a high traffic road would, when setting up the collar zones, simply walk an outer limit farther from the edge of the road. This maintains more consistent zone widths, which is believed to offer better training for an animal than varying the width of the zones. Nevertheless, and alternatively, it is contemplated herein to allow a person the ability to vary the width of zones to correspond with various objects or hazards such as fences, gardens, and roadways.

Figure 3:
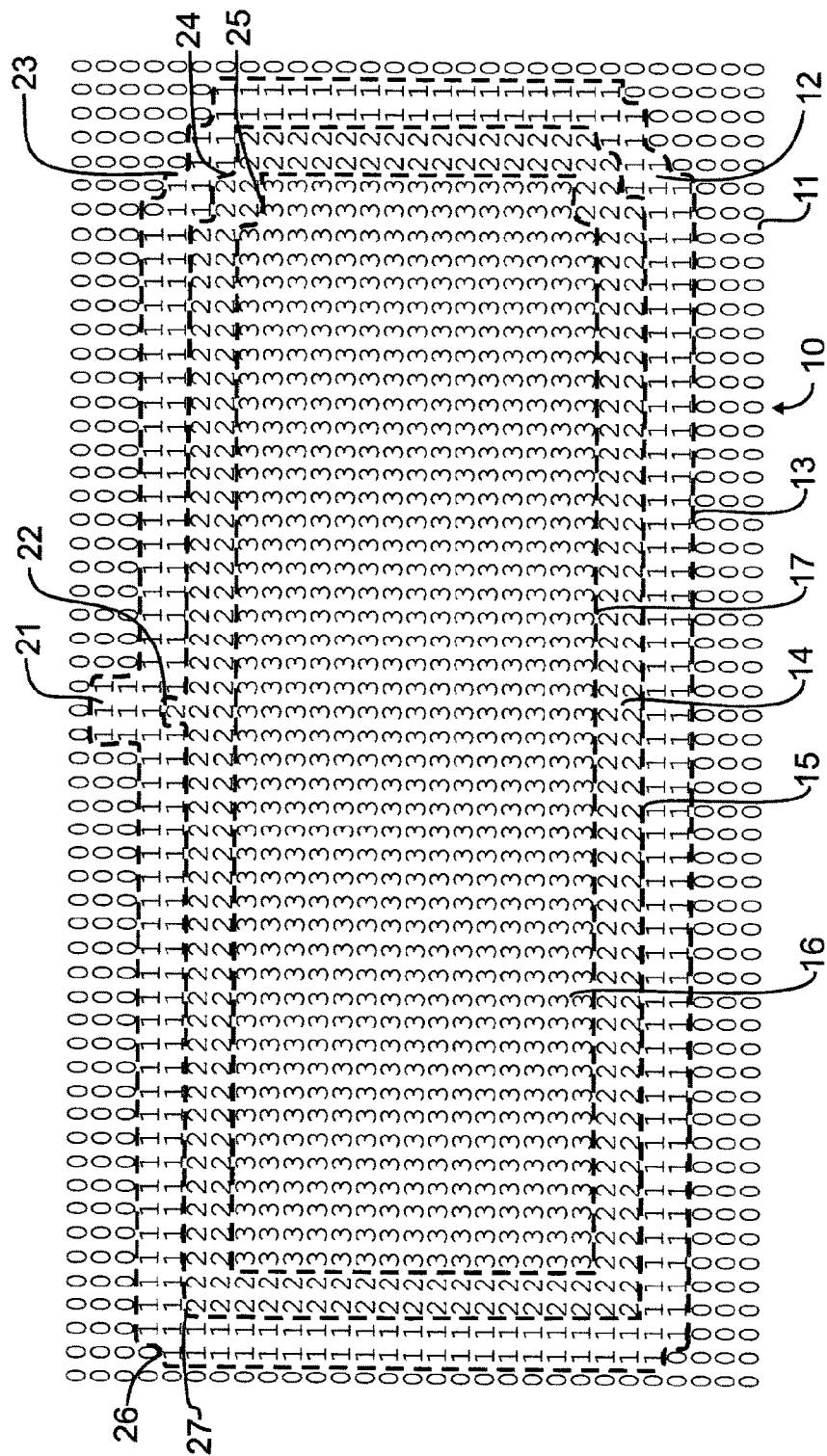
FIG. 3 illustrates the map of numerical values of FIG. 2, but absent the property illustrations.

FIG. 3 illustrates the data table representation of the land area of FIG. 1, but without the land features shown. FIG. 3 simply shows the latitudinal and longitudinal plot of the shape of the assisted guidance zones, as defined by the numerical values stored in the data table. In accord with the present invention, a latitude and longitude land map is converted to and saved as an X-Y plot or table of points, where one axis (in this case the rows) represents latitude and the other axis (in this case as illustrated, the columns) represents longitude. Each point is then assigned a numerical value that is representative of a zone within the assisted guidance area.

These points may for exemplary purposes and in accord with the preferred embodiment, correspond to specific points of geographic latitude and longitude determined to a particular degree of resolution. The degree of resolution may typically be the limit of precision available for a particular location system, such as six decimals of precision in a GPS system. So, as represented in FIG. 4, the latitude and longitude representations are presented to six decimal precision, though other suitable levels of precision are considered incorporated herein.

Figure 4:
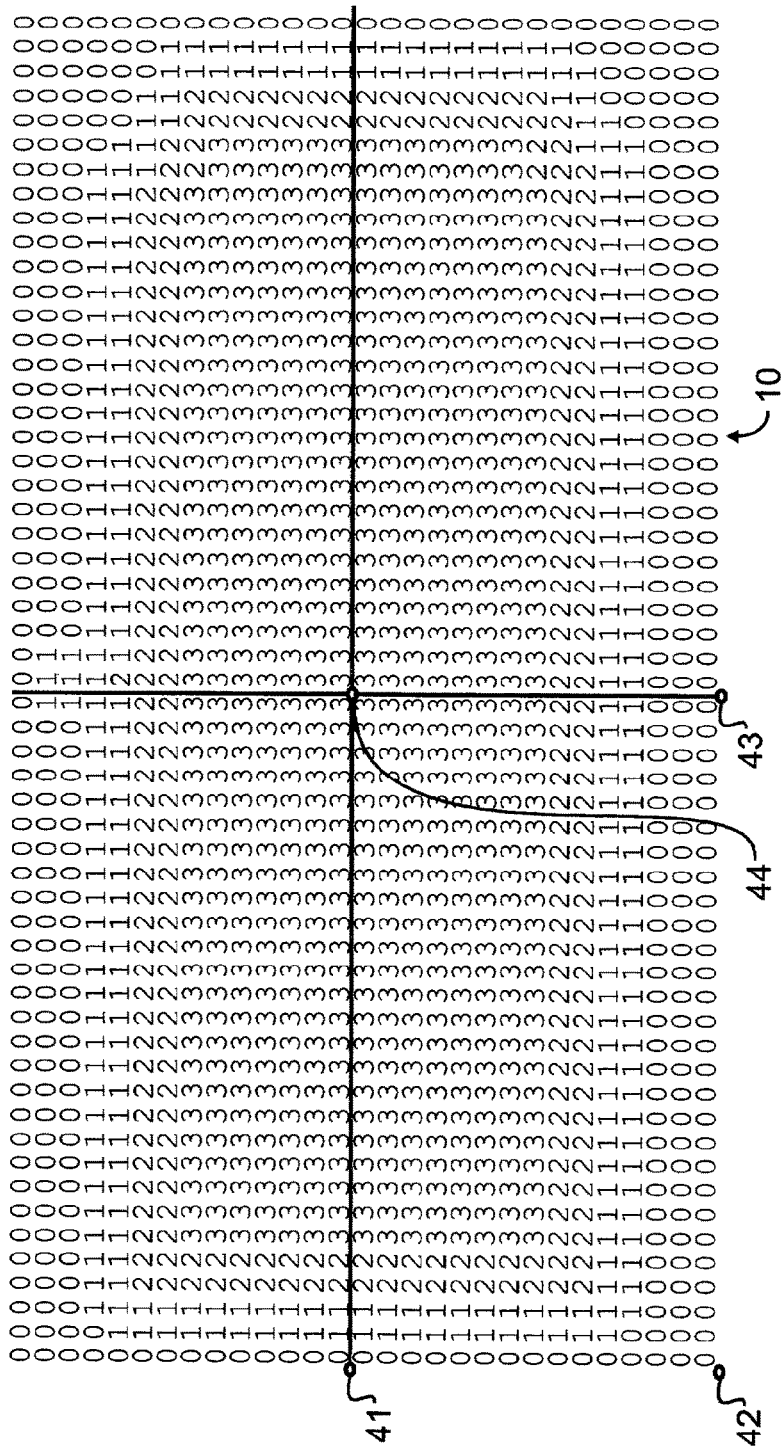
FIG. 4 illustrates the map of numerical values of FIG. 3, divided into four distinct tiles and including a latitude and longitude reference point associated with each tile.

In this illustration of FIG. 4, reference point 41 may for example represent a point at 44.925866 degrees latitude, and −92.940617 longitude. Reference point 42 may represent a point at 44.925673 degrees latitude, and −92.940617 longitude. Reference point 43 may be used to represent a point at 44.925673 degrees latitude, and −92.940160 longitude. Reference point 44 may be used to represent a point at 44.925866 degrees latitude, and −92.940160 longitude. While as illustrated these reference points 41-44 are shown slightly offset from and intermediate between the various data points, they may instead be selected to correspond exactly to a particular data point in the table.

As may be appreciated, for a given degree of latitude and longitude resolution, the larger a tile is, the more memory is required to store the tile. In other words, if the resolution were representative of five foot increments across the surface of the earth, it would only take twenty of these increments to cover a one hundred foot property boundary. For a square property of 100 feet by 100 feet, there would only be a total of 400 data points within the outer boundary. Even with the inclusion of data points outside of the boundary, this zone could easily be mapped with a thousand data point tile.

In contrast, a large property such as a large ranch, farm, park or the like could, using this same five foot resolution, require more than one million points to map. As may be appreciated, this requires one thousand times the tile size to save the entire map zone within a single tile in memory, or one thousand times the available memory.

Storage of the data table requires memory, and a suitable electronic system within the collar will not be provided with unlimited memory within which to store data points. In accord with a preferred embodiment of the system, the memory will be divided into some combination of slower non-volatile memory and relatively faster but volatile RAM. The slower, non-volatile memory for exemplary but non-limiting purposes might comprise well-known flash memory. If the device uses higher speed memory such as RAM to reduce operation time, and there are more data points than available space in RAM to store the table, the preferred embodiment processor will analyze the table and set up one or more tiles in RAM to be used during system operation.

To cover the exemplary property of FIG. 1, the numerical representation of FIG. 4 incorporates a total of four distinct "tiles" or squares that contain these numerical representations. FIG. 5 provides a zoomed-in view of only one of these four tiles, the top left tile of FIG. 4. Using this preferred numerical representation substantially reduces the calculations required when compared to the prior art.

In exemplary operation, the latitude-longitude location of a dog is determined through the GPS system as is known in the field of navigation. This is then used to determine which tile, plurality of tiles, or single numerical representation is required to determine the position of the dog. If the tile containing the particular latitude and longitude is not already loaded into RAM, then it will be loaded. This determination will be easily made by comparing the current latitude and longitude to the reference points such as points 41-44 to select the appropriate tile(s). Then, preferably and for exemplary purposes, a simple RAM access may be made, where the RAM memory location is calculated based upon the present latitude and longitude offset from the lower-left latitude and longitude found on the numerical representation tile. This lower-left corner may be understood to be the reference location for the tile, such as reference point 41 in the illustration of FIG. 5. While any point within a tile may be used as a reference location, the lower-left is illustrated for exemplary purposes.

Figure 5:
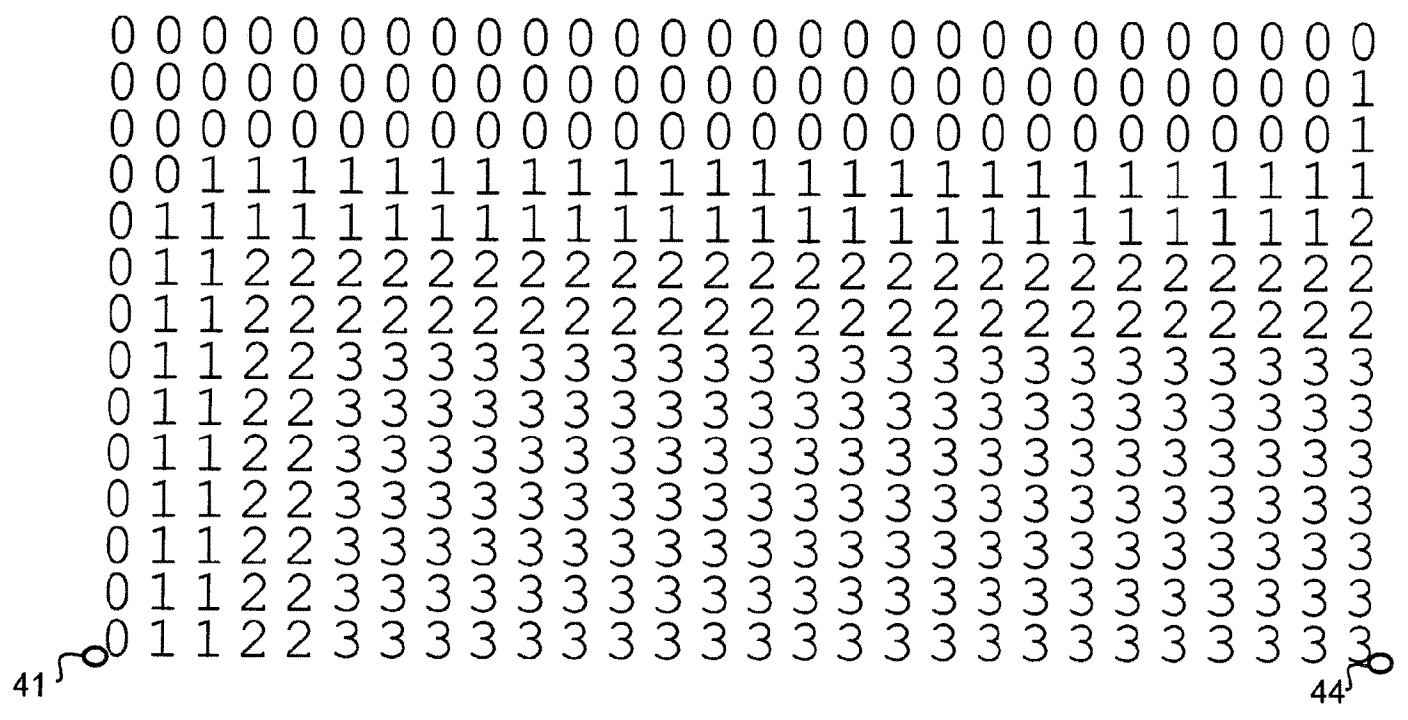

The offset determination is a simple subtraction of the reference location, such as reference point 41 of FIG. 5, from the currently determined location. Then, this difference is used as the table index, to directly address the particular table location. In the preferred embodiment, each data point is stored in memory using a double-indexed array, with each of the two indices of the array uniquely representing one of the latitudinal or longitudinal offset from the reference point. For exemplary purposes, this may be written as ArrayName [latitude-offset][longitude-offset]. Each unique [latitude-offset][longitude-offset] may for exemplary purposes point to a unique location in memory where the zone value associated with that geographic location is stored.

In an alternative embodiment, the offset may be additionally converted in a proportional or scalar calculation, where a particular number of degrees of latitude, for example, are known to equal one data point shift to the right in the table. This requires storing the scalar conversion and an extra scalar calculation to look up the data value for a location, both which may be undesirable.

Once the offset is calculated, then the memory location is queried and the contents of the memory are returned in the form of a numerical value from 0-3, the meaning which represents whether the dog is comfortably within the safe zone ("3" in the preferred embodiment), or is in the alert, warn or out-of-bounds zones. After GPS location is determined, the only calculation required during operation of the dog collar to determine whether the collar is within the assisted guidance zone is the calculation of offset in latitude and longitude from the reference point in the lower left corner of the tile. This is a very rapid and easy calculation, followed by a near-instantaneous read of the memory contents. In the preferred embodiment then, all numerical representation calculations are performed at the time the outer limit is defined, and then these numerical representation tiles are saved, preferably in non-volatile memory such as within EEPROM, flash memory, or equivalent storage.

The procedure used to clear a map form memory is also quite simple in the preferred embodiment. Once the user selects the map to delete, the associated tiles in memory are simply rewritten to numerical values of zero.

When the collar is in use, the numerical representation tiles may be swapped into and out of active memory as required. This means that storage of diverse locations does not require storage of every location in between. So, for example, storage of two distinct one acre maps on opposite sides of the earth does not require storing millions of acres of maps. Instead, only those tiles associated with a latitude and longitude actually used by a map are required to be stored in memory. Again, while the use of tiles is not essential to the operation of the present invention, the ability to create these tiles means that with only very modest amounts of memory and processing capability, the present invention may be used to map one or a plurality of assisted guidance areas literally anywhere on earth.

A number of other features may also desirably or optionally be incorporated into a preferred embodiment pet assisted guidance system. Using the teachings of the present invention, the collar may be designed to contain an entire and independent pet assisted guidance system. In other words, no additional components would need to be purchased or acquired, nor is there a need for any other external device other than the GPS satellites. The collar will preferably interact directly with GPS signals received from GPS satellites, and may for enablement use a commercially available set of components to determine latitude and longitude.

When desired, a remote control interface or external device may also be provided, but such device is preferably not mandatory. Where such an interface is provided, assisted guidance areas may also be communicated that are calculated without requiring a person to first walk the perimeter. While not solely limited thereto, this can be particularly helpful at popular places such as at dog parks or other public places that might be frequented by many pet owners. In such case, a map already created for the park will be provided and may, for exemplary purposes, be downloaded to the collar. Additionally, with such an interface a user might draw an assisted guidance area perimeter or even various zones on a map and transmit them to the collar. Furthermore, stimulation of any suitable type may be provided to the external device, either complementary to or instead of through the collar stimulation device.

As aforementioned, there will preferably be multiple zones in the assisted guidance area such as the "safe", "alert" and "warning" zones to train and shape the behavior of a pet. For exemplary purposes, a comforting stimulus may be provided at particular intervals to assure or reassure a dog within the safe zone 16. Furthermore, such stimulus may be timed in accord with activity of the dog, such as when the dog is moving about and remaining within safe zone 16. For exemplary purposes and not solely limiting thereto, a comforting tone or recorded sound such as the owner's voice saying "good dog" may be periodically generated. In one embodiment contemplated herein, the velocity of the dog, including direction and speed, will also be calculated. In the event there is a danger of the dog moving outside of the safe zone, the comforting stimulus may be withheld, until the dog is confirmed to be remaining in safe zone 16.

The alert zone 14 assigned with a numeric value of "2" may be used to generate a vibration which is preferably very distinct from the comforting tone or "good dog" recording of safe zone 16. This will preferably gently alert the dog of the transition out of safe zone 16 and to the need to return thereto.

The warning zone 12 assigned with a numeric value of "1" may be used to trigger an electrical stimulation. Most preferably, this electrical stimulation will be provided through a set of probes using the technology such as illustrated in U.S. Pat. No. 7,677,204 incorporated by reference herein above, which is considered to be a most humane method of application. Nevertheless, and while much less preferable, other known techniques for electrical stimulation will be considered herein as alternative embodiments. In the warning zone, this stimulation may be relatively mild or medium stimulation.

Finally, a numeric value of "0" designates a point outside of the warning zone. In this case, initially the dog may be stimulated with a stronger electrical stimulation. However, this stimulation will most preferably not continue indefinitely, which will be recognized to be quite aversive. Instead, the dog will preferably receive input similar to that which would be provided by a skilled trainer if the trainer were there in person and controlling the collar unit. In the foregoing description, time is described as one factor for calculating when to discontinue electrical stimulation. Preferably, in addition to time, the direction of travel of the dog will also be considered. As soon as the dog starts moving towards the safe zone, stimulation will be discontinued irrespective of time outside of the safe zone.

This allows appropriate pet behavior to be rewarded, thereby improving training effectiveness and success. Nevertheless, the present invention is not solely limited to a particular number of zones, or a particular way to represent those zones. The numerical representations from zero to three are preferred, but any other representations that may be machine stored are contemplated herein.

Desirably, the accuracy of the GPS determinations may be significantly improved by incorporating a loosely coupled inertial navigation system into the collar. The inertial navigation system may then be used to validate GPS readings, and may also be used to discard outlier position info such as might be produced sporadically. For exemplary purposes, when an inertial system indicates no movement of the dog and a GPS or equivalent determination indicates a sudden multi-meter jump, then the data point indicative of a sudden multi-meter jump can be discarded or ignored.

An inertial system or biometric system may also optionally be used to pre-alert dog state and predict sudden location changes. This can be used to be more pre-emptive at alerting or warning the dog of impending boundaries. Exemplary biometric indicators might be heart or respiration rate, while a sudden head lifting or movement is an exemplary inertial indicator.

Inertial, biometric and location-based indicators may further be used to control the frequency of position calculation, which in turn is related to the average power consumption and battery life. So, for exemplary purposes, if the collar is in a dwelling, the GPS may be deactivated. Similarly, if inertial and/or biometric indicators suggest that the dog is sleeping, sampling rate may be substantially less frequent, if at all, until the dog wakes up. Additionally, when the dog is within the safe zone, the sampling rate may also be less frequent.

While the preferred embodiment table 10 has been described herein above for the purposes of enablement as cooperative with a self-contained collar apparatus such as that illustrated by Swanson et al in 2007/0204804, it should be apparent that the table 10 incorporating discrete values representative of various zones may be used with other apparatus such as found in many other patents incorporated herein by reference above and other systems, as will be understood and appreciated by those skilled in the art.

As but one taught in U.S. Pat. No. 7,034,695 by Troxler, incorporated by reference herein above, a system useful for containing a dog to a specific area or region also has application for various machines and apparatus as well, in many instances having similar concerns and challenges. For exemplary and non-limiting purposes, the movement of an airplane, automobile, or construction machine may be limited and restricted to particular distinct areas.

Consequently, while the foregoing details what is felt to be the preferred embodiment of the invention, no material limitations to the scope of the claimed invention are intended. The variants that would be possible from a reading of the present disclosure are too many in number for individual listings herein, though they are understood to be included in the present invention. Further, features and design alternatives that would be obvious to one of ordinary skill in the art are considered to be incorporated herein. The scope of the invention is set forth and particularly described in the claims herein below.

We claim:

1. A wireless location assisted zone guidance system adapted to assist in the management of an apparatus, having an apparatus mount, a wireless location determination apparatus configured to generate a current latitude and current longitude of a current geographic location of said apparatus, at least one signaling apparatus carried by said apparatus mount, a processor coupled to said wireless location determination apparatus and operative to receive said current latitude and said current longitude information therefrom, memory accessible by said processor, a human interface, and a plurality of guidance zones defined using said latitude and longitude information, each one of said plurality of guidance zones having an associated unique set of characteristics used by said processor to provide guidance through said at least one signaling apparatus, wherein the improvement comprises:

a data table that is stored in said memory, has a pair of indices, and contains a plurality of unique locations within said data table that are populated with a plurality of guidance zone values;

a first one of said pair of indices corresponding to longitude;

a second one of said pair of indices corresponding to said latitude;

said pair of indices in combination identifying a single one of said plurality of unique locations within said data table; each one of said plurality of unique locations within said data table that is also within a one of said plurality of assisted guidance zones storing an individual one of said plurality of guidance zone values; individual ones of said guidance zone values stored in said data table identifying individual ones of said plurality of guidance zones;

wherein said processor is configured to retrieve a guidance zone value stored in said data table at a single data table location defined by a first index value corresponding with said current longitude and a second index value corresponding with said current latitude and use said associated unique set of characteristics to provide guidance stimulation to said apparatus through said at least one signaling apparatus.

2. The wireless location assisted zone guidance system adapted to assist in the management of an apparatus of claim 1, further comprising a plurality of tiles of two-dimensional data, each one of said plurality of tiles representative of unique geographic latitude and longitude locations.

3. The wireless location assisted zone guidance system adapted to assist in the management of an apparatus of claim 2, wherein each one of said plurality of tiles of two-dimensional data further comprises a reference location corresponding to a specific geographic latitude and longitude.

4. The wireless location assisted zone guidance system adapted to assist in the management of an apparatus of claim 3, wherein said processor is adapted to operatively selectively load a unique one of said plurality of tiles of two-dimensional data into said memory responsive to reception by said processor of latitude and longitude information from said wireless location determination apparatus and responsive to comparison by said processor of said received latitude and longitude information with said tile reference locations.

5. The wireless location assisted zone guidance system adapted to assist in the management of an apparatus of claim 4, wherein said memory further comprises volatile memory and non-volatile memory, and only a one of said plurality of tiles is stored in said volatile memory at a time, while all others of said plurality of tiles remain solely in said non-volatile memory.

6. The wireless location assisted zone guidance system adapted to assist in the management of an apparatus of claim 1, wherein said data table is stored in said memory as a double-indexed array.

7. The wireless location assisted zone guidance system adapted to assist in the management of an apparatus of claim 1, wherein said wireless location determination apparatus, said processor, and said memory are local to said apparatus mount.

8. The wireless location assisted zone guidance system adapted to assist in the management of an apparatus of claim 1, wherein said processor is configured responsive to said retrieved guidance zone value to select a single one of said associated unique set of characteristics used by said processor to provide guidance stimulation to said apparatus through said signaling apparatus.

9. The wireless location assisted zone guidance system adapted to assist in the management of an apparatus of claim 1, wherein said plurality of assisted guidance zones further comprise: a safe zone associated with a first guidance stimulation; an alert zone circumscribing said safe zone associated with a second guidance stimulation different from said first guidance stimulation; and an out-of-bounds zone circumscribing said alert zone associated with a third guidance stimulation different from said first and second guidance stimulations.

10. The wireless location assisted zone guidance system adapted to assist in the management of an apparatus of claim 9, wherein said plurality of assisted guidance zones further comprise: a warning zone circumscribing said alert zone and circumscribed by said out-of-bounds zone, said warning zone associated with a fourth guidance stimulation different from said first, second, and third guidance stimulations.

11. A wireless location assisted zone guidance system adapted to assist in the management of an apparatus, comprising:

a wireless location determination apparatus;
at least one signaling apparatus;
a processor coupled to said wireless location determination apparatus and configured to receive latitude and longitude information therefrom and coupled to said at least one signaling apparatus and configured to control a generation of stimulation;
memory coupled with and accessible by said processor;
a data table stored in said memory as a double-indexed array having a first index operatively representing longitude and having a second index operatively representing latitude; and
a plurality of geographically defined assisted guidance zones stored and positioned in said data table as safe, alert, warning, and out-of-bounds values, with each assisted guidance zone position in said data table having a one of said safe, alert, warning, and out-of-bounds values stored in said data table and defined by said first index and said second index, with each one of said safe, alert, warning, and out-of-bounds values providing guidance stimulation to said apparatus through said signaling apparatus; said processor configured to receive said latitude and longitude information from said wireless location determination apparatus, retrieve a single one of said safe, alert, warning, and out-of-bounds values stored in an assisted guidance zone position in said data table using said longitude information to determine said first array index and said latitude information to determine said second array index, and use said retrieved single value that said latitude and longitude information from said wireless location determination apparatus defines to provide guidance stimulation to said at least one signaling apparatus.

12. The wireless location assisted zone guidance system of claim 11, wherein said processor is further configured to divide each said assisted guidance zone positions into a plurality of tiles each containing double-indexed data having a reference location corresponding to a specific geographic latitude and longitude.

13. The wireless location assisted zone guidance system of claim 12, wherein said processor is configured to selectively load a unique one of said plurality of tiles of double-indexed data into said memory responsive to reception by said processor of said latitude and longitude information from said wireless location determination apparatus and comparison by said processor of said received latitude and longitude information with said tile reference locations.

14. The wireless location assisted zone guidance system of claim 12, wherein said processor is configured to determine a value of said first index by subtracting said tile reference location longitude from said wireless location determination apparatus longitude information and is configured to determine a value of said second index by subtracting said tile reference location latitude from said wireless location determination apparatus latitude information.

15. The wireless location assisted zone guidance system of claim 11, wherein said wireless location determination apparatus, said processor, and said memory are local to said at least one signaling apparatus.

* * * * *